United States Patent [19]
Daniel et al.

[11] 3,819,210
[45] June 25, 1974

[54] METHOD AND ASSEMBLY FOR CONTROLLING THRUST FORCES IN A PIPE ARRANGEMENT

[75] Inventors: Leonard Irving Daniel, Flagtown; Thomas H. Sadler, Belle Mead, both of N.J.; John F. Nawn, Denver, Colo.; David Walter French, Denison, Tex.

[73] Assignee: Johns-Manville Corporation, Greenwood Village, Colo.

[22] Filed: May 8, 1972

[21] Appl. No.: 251,215

[52] U.S. Cl. .................................. 285/114, 285/223
[51] Int. Cl. .................................................... F16l
[58] Field of Search ........................... 285/114, 223

[56] References Cited
UNITED STATES PATENTS

| | | | |
|---|---|---|---|
| 2,568,923 | 9/1951 | McNeary et al. | 285/114 X |
| 2,661,963 | 12/1953 | Brown et al. | 285/114 |
| 3,010,736 | 11/1961 | Dilley | 285/114 |

*Primary Examiner*—Dave W. Arola
*Attorney, Agent, or Firm*—Robert A. Krone; Stephen C. Shear

[57] ABSTRACT

An assembly for and method of controlling the internal thrust forces in a pressurized fluid conveying pipe arrangement, including a plurality of pipe sections interconnected by coupling members, is disclosed herein and utilizes a plurality of support plates or plate members and interconnecting rods. One of the support plates is disposed around and rigidly secured to a predetermined pipe section, specifically the valve, tee, elbow or other such direction-changing, thrust-creating fitting, when the latter is used. The remaining plates are respectively disposed around selected ones of the remaining pipe sections, and respectively positioned in abutting relationship with the ends of preselected coupling members. The plates, including the rigidly secured plate, are interlocked together by a plurality of axially extending rods which prevent the plates from moving relative to one another. In this manner, those pipe sections positioned between the end most support plates are restrained from moving relative to the aforestated predetermined pipe section so as to restrain those individual sections from otherwise uncoupling from one another in response to internal thrust force caused by the conveyed pressurized fluid.

9 Claims, 3 Drawing Figures

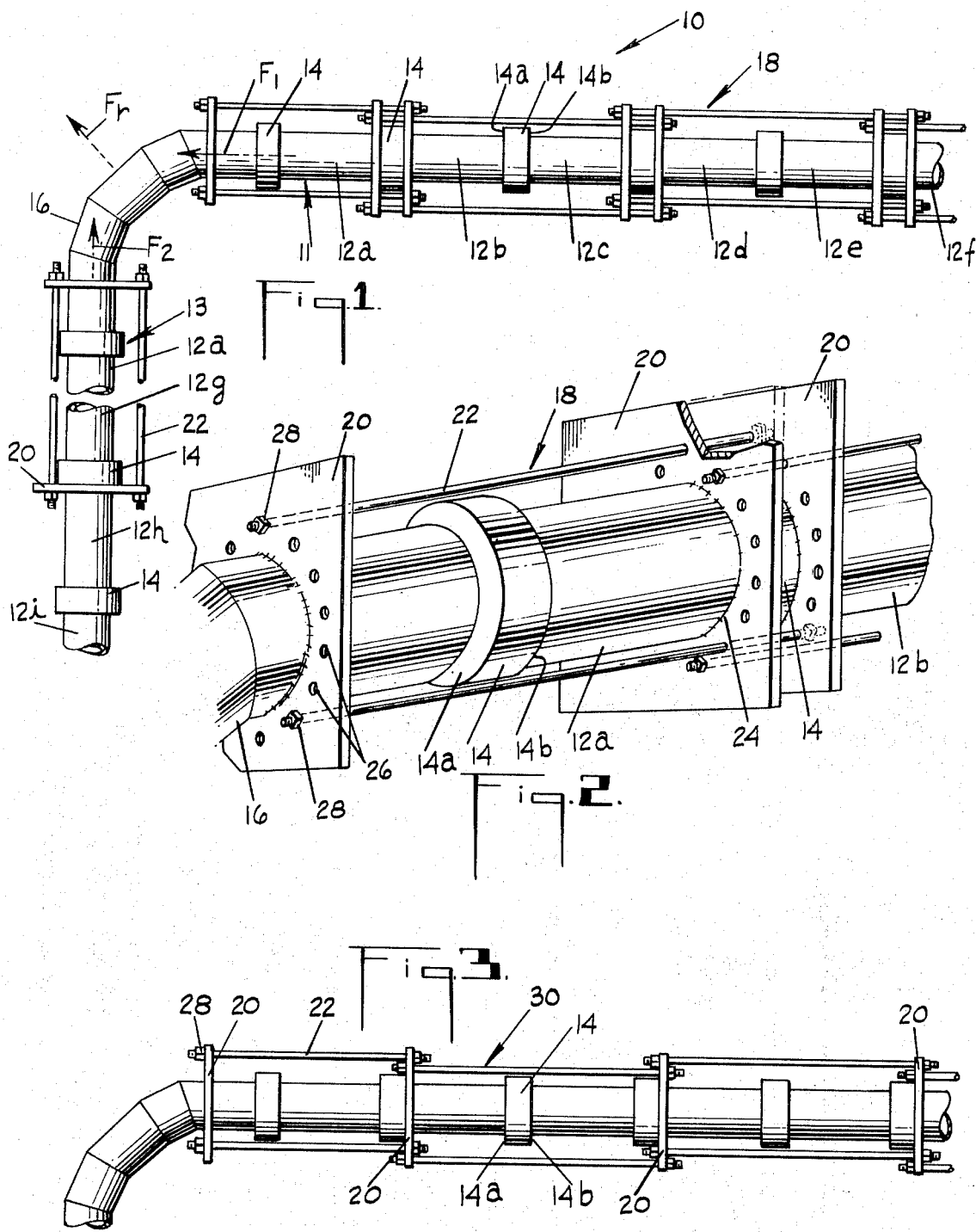

METHOD AND ASSEMBLY FOR CONTROLLING THRUST FORCES IN A PIPE ARRANGEMENT

BACKGROUND OF THE INVENTION

1. Field of the Invention

The present invention is directed generally to pipe arrangements and, more particularly, to an assembly for and method of controlling the internal thrust forces in an arrangement of interconnected pipe sections provided for conveying fluid under pressure.

2. Description of the Prior Art

It is well-recognized that most underground utility piping used today comprises an arrangement of relatively short pipe sections coupled together by suitable means so as to provide a single unit. However, it has been found that when fluid under pressure is conveyed through the interconnected pipe sections, internal thrust forces build up therein and, in some cases, tend to cause uncoupling of the individual sections. This is especially true at a valve, tee, elbow or other such direction-changing fitting. Heretofore, pipe sections were commonly constructed of steel or other such metal and welded together to provide, in essence, an integral unit. Hence, the fear of any two or more sections uncoupling from one another due to internal thrust forces was minimized, if not completely eliminated.

However, with the advent of rubber ring flexible jointing, the aforedescribed welding method could, of course, no longer be used. Hence, it has been the practice with rubber ring flexible jointing, to use a thrust-blocking device, which is generally a poured concrete block, at each valve, tee, elbow, or other fitting where there is a change in direction in the piping arrangement. This method is quite satisfactory where only one or, at most, two pipe lines are placed in the same trench. However, where multiple lines are positioned in the same trench, it is very difficult, if not impossible, to use thrust-blocking devices for controlling the internal thrust forces within the pipes.

As will be seen hereinafter, the present invention provides an uncomplicated and novel method of controlling the internal thrust forces in an arrangement of interconnected pipe sections and may be especially used where a large number of pipelines with rubber ring flexible joints are positioned in the same trench.

OBJECTS OF THE INVENTION

In accordance with the foregoing, an object of the present invention is to provide a novel assembly for and method of controlling the internal thrust forces in a pressurized fluid conveying arrangement of interconnected pipe sections, the assembly and method being especially suitable where a large number of such pipe arrangements are positioned in the same underground trench, and where the individual pipe sections are connected by rubber ring flexible joints.

Another object of the present invention is to provide a novel assembly for and method of securing together a plurality of intercoupled pipe sections for, in effect, providing an integral unit.

Yet another object of the present invention is to provide a novel underground pipe assembly which is held fixed relative to the earth regardless of internal thrust forces caused by fluid under pressure being conveyed through the pipe assembly.

These and other objects and features of the present invention will become apparent from the following descriptions.

DESCRIPTION OF THE DRAWINGS

FIG. 1 is a plan view of a pipe assembly constructed in accordance with the present invention.

FIG. 2 is a partially broken-away perspective view of a section of the pipe assembly of FIG. 1.

FIG. 3 is a plan view of a modified pipe assembly constructed in accordance with the present invention.

DETAILED DESCRIPTION

Turning now to the drawing, wherein like components are designated by like reference numerals throughout the various figures, attention is specifically directed to FIG. 1 which illustrates a pipe assembly 10 constructed in accordance with the present invention. The assembly includes a first arrangement 11 of spaced-apart and coaxial straight pipe sections 12a, 12b, 12c, 12d, 12e, 12f and so on, depending upon the total pipe length desired. The individual pipe sections, which can be constructed of any piping material utilizing rubber ring flexible joint systems which do not transmit thrust forces, are connected to one another at their adjacent ends by conventional coupling or other such connecting members 14. As illustrated, the members circumscribe the confronting ends of adjacent pipe sections and provide opposing annular shoulders 14a and 14b extending radially outwardly from the pipe sections.

As illustrated in FIG. 1, assembly 10 also includes a second arrangement 13 of spaced-apart and coaxial pipe sections which are identical to and connected together in the same way as pipe sections 12a through 12f and so on, but which extend in a direction at an angle to that of the first-mentioned arrangement. Because the arrangement 13 of interconnected pipe sections is preferably identical to the arrangement 11, like components of the two arrangements will be designated by like reference numerals. However, for purposes of simplicity, the second-mentioned arrangement is broken away and only shows pipe sections 12a, 12g, 12h and 12i.

The two pipe arrangements are connected together by an elbow, valve or other fitting 16, the ends of which are respectively connected to the otherwise free ends of the two pipe sections 12a of pipe arrangements 11 and 13 by additional coupling members 14. The fitting is preferably constructed of steel or other such weldable material. While an elbow fitting is, of course, suitable where the pipe arrangements are perpendicular to one another, it is to be understood that the present invention is not limited to this particular configuration. For example, a third pipe arrangement may be provided and appropriately positioned for requiring a tee fitting or valve. In fact, as will become apparent hereinafter, the present invention is equally appropriate where only one pipe arrangement is utilized.

As is well-recognized, upon conveying a fluid under pressure through the aforedescribed pipe assembly, uniformly distributed internal thrust forces build up therein. The particular forces to which the present invention is directed are those which are axially directed out of the ends of straight line arrangements 11 and 13, as generally indicated by the arrows $F_1$ and $F_2$, respectively. These forces, which together produce a resultant force $F_r$ at fitting 16, have heretofore been the cause of great concern in the installation of individual pipe sections. Specifically, the forces $F_1$ and $F_2$, unless compensated for, may cause the various pipe sections to uncouple from one another, especially at the fitting, thereby allowing the particular fluid conveyed through the pipe sections to escape therefrom. One method of compensation is to suitably weld the various interconnected pipe sections together so as to overcome the internal thrust forces. However, of course, this is only applicable where the pipe sections are constructed of a metallic or otherwise weldable material. On the other hand, where the individual pipe sections are joined with a rubber ring flexible joint system, it has been the practice, as is stated hereinabove, to position a cement thrust block around the valve, tee, elbow or other such fitting. However, as also stated hereinabove, this is not practical and, in many cases, not possible where a large number of pipelines are positioned in the same trench.

As will be seen hereinafter, the present invention is directed to an arrangement 18 of plates and rods provided for securing the various interconnected sections of each straight line pipe arrangement 11 and 13 to one another so as, in essence, to provide an integral unit and thereby restrain the various sections from otherwise uncoupling from one another in response to the internal thrust forces. Arrangements 18 are especially suitable with pipe sections utilizing rubber ring flexible joints where a large number of pressurized fluid conveying underground pipelines are positioned within the same trench.

As illustrated best in FIG. 2, each of the arrangements 18 include a plurality of rectangular plate members 20 and a plurality of connecting rods 22. Each of the plate members include a centrally-located circular bore or passage 24 having a diameter slightly greater than the outer diameters of the various pipe sections. In this manner, the plate members can be slidably disposed around the individual pipe sections, as shown in FIG. 2. In addition, each plate member includes a plurality of substantially smaller passages or bores positioned equally circumferentially around center bore 24. As will be seen hereinafter, bores 26 are adapted to receive rods 22 therethrough.

Returning to FIG. 1, it should be noted that one plate member of each arrangement 18 is disposed around a respective end portion of fitting 16 and held rigidly fixed thereto. This is preferably accomplished by welding the plate member to the fitting, as indicated best in FIG. 2, since the fitting, as stated above, is preferably constructed of steel or other such metallic material. A second plate member 20 of each arrangement 18 is disposed around a corresponding pipe section 12a and positioned in abutting relationship against the annular shoulder 14a of the coupling member connecting pipe sections 12a and 12b together. In a similar fashion, the third plate member of each arrangement is disposed around a corresponding adjacent pipe section 12b and positioned in abutting relationship against the opposite annular shoulder, that is, shoulder 14b of the same coupling member 14 which connects pipe sections 12a and 12b together.

As illustrated in FIG. 1, the next successive pairs of plate members of each arrangement 18 are positioned around connection coupling member 14 in the same manner as the previously described second and third plate members. Unlike those plate members which are rigidly secured to fitting 16, the remaining plate members of each arrangement 18 are loosely positioned around their respective pipe sections and are not secured to either the pipe sections or the abutting coupling members.

In the particular embodiment illustrated in FIG. 1, the very last plate member of each arrangement 18 is disposed around the pipe section 12h and against the annular shoulder 14b of the coupling member 14 which interconnects the last-mentioned pipe section with pipe section 12g. For reasons which will become apparent hereinafter, a plate member is not necessary on the opposite side of this particular coupling member.

As stated above, each arrangement 18 includes a plurality of connecting rods 22. As illustrated best in FIG. 2, a first group of these plurality of rods are positioned through aligned passages 26 in the first three successive plate members 20 starting with that plate member securely fastened to fitting 16. These rods, which extend in a direction parallel to the axis of the individual pipe sections, are threaded at their opposite ends. In this manner, nuts and washers 28 can be threaded around the ends of the rods and in tight engagement against opposite sides of the first and third plate members. A second group of rods are positioned through aligned passages 26 in the first and second successive pairs of the support plates which abut common coupling members 14, the rods being secured in these positions in the same manner described above, that is, with nuts and washers 28. Similarly, yet another group of rods are disposed through passages in the second and third pair of support plates and secured in this position by nuts 28. This procedure continues until the very last support plate of eachh arrangement receives a group of bolted rods, as illustrated in FIG. 1. In this regard, for purposes of clarity, only two rods are shown in any particular group. It is to be understood that the exact number of rods of the groups is not limited to two, but will depend upon the magnitude of the internal forces, strength of the rods and other factors readily calculated by one with ordinary skill in the art.

From the foregoing, it should be readily apparent that the various support plates positioned against corresponding coupling members are held in place relative to that support plate rigidly secured to fitting 16 by the abutting coupling members and aforedescribed arrangement of connecting rods. In this manner, the entire arrangement of plates and rods restrains those pipe sections positioned substantially entirely between the first and last plate member, that is, Sections 12a through 12g, from axially moving relative to fitting 16. Hence, the fitting 16 and both arrangements 11 and 13 of individual pipe sections 12a to 12g act substantially as an integral unit in response to the aforedescribed internal thrust forces and particularly forces $F_1$ and $F_2$. This is accomplished without welding any components together other than those plate members disposed around fitting 16. Hence, the pipe sections do not have to be constructed of a metallic or otherwise weldable material. In addition, by utilizing arrangements 18, a large number of pipelines can be positioned in the same trench.

As is well-known, when a pipeline is positioned underground, the earth around the pipeline imparts to the latter a certain degree of resistance to movement. Hence, for the pipeline to move in response to the internal thrust forces caused by conveyed pressurized fluid, for example forces $F_1$ and $F_2$, the forces must be greater than the resistance to these forces imparted to the pipeline by the surrounding earth. There are many factors which contribute in determining the amount of resistance imparted to the pipeline by the surrounding earth. These factors are well-known and may be readily calculated by one with ordinary skill in the art. However, one such factor is the length of the pipeline. Hence, for a given internal thrust force $F_1$, it will take a precalculated number of individual pipe sections to dissipate or overcome the thrust force $F_1$, depending upon the length of each section and the overall length required, and a precalculated number of individual sections to dissipate or overcome the thrust $F_2$. Therefore, only a predetermined or precalculated number of individual pipe sections of each arrangement 11 and 13 need be secured together by the aforedescribed arrangement of plate members and connecting rods.

As illustrated in FIG. 1, arrangements 18 secure fitting 16 with pipe sections 12a to 12g. However, depending upon the aforestated readily calculatable factors, a greater or lesser number of pipe sections may be necessarily secured to the fitting to overcome and disipate the internal thrust forces. In this regard, as illustrated in FIG. 1, plate members 20 have been positioned on opposite sides of every other coupling member 14. However, the support plates could be positioned on opposite sides of each coupling member, every third coupling member or in any other similar fashion depending upon the length of the pipe sections.

Attention is now directed to FIG. 3 which illustrates a modified arrangement 30 of plate members 20 and connecting rods 22. Like arrangement 18, the first plate member 20 of arrangement 30 is disposed around one end portion of fitting 16 and welded thereto. However, rather than having support plates positioned in abutting relationship against opposite sides of the various coupling members 14, the remaining support plates of arrangement 30 are positioned only against the sides or annular shoulders 14b of corresponding coupling members, none being positioned against annular shoulders 14a. The first group of rods 22 and nuts 28 are provided for interlocking the first two support plates. The second group of rods and nuts are provided for interlocking the second and third support plates and so on, as illustrated in FIG. 3. In this manner, arrangement 30 secures the fitting 16 and interconnecting individual pipe sections together in the same manner described with respect to arrangements 18. In addition, like arrangement 18, every other coupling member is engaged by a respective support plate. However, the support plate may be provided against each successive coupling member, every third coupling member or in any other similar fashion.

It is to be understood that variations and modifications of the present invention may be made without departing from the spirit of the invention and that the scope thereof is not to be interpreted as limited to the specific embodiments disclosed herein, but rather in accordance with the appended claims when read in light of the foregoing disclosure.

What we claim is:

1. An assembly for controlling the internal thrust forces in a pressurized fluid conveying pipe arrangement including a plurality of pipe sections interconnected by coupling members sealingly connecting said pipe sections, said assembly comprising:
   a. a first plate member disposed around and rigidly fastened to a predetermined one of said pipe sections;
   b. a second plate member disposed around another of said pipe sections and in abutting relationship with one end of a coupling member connecting said last-mentioned pipe section with still another pipe section located between said first and last-mentioned pipe sections;
   c. a plurality of rod means interlocking said plate members to one another for restraining those pipe sections positioned substantially entirely between said plate members from otherwise axially moving relative to said first-mentioned pipe section in response to internal thrust forces caused by said pressurized fluid;
   d. a third plate member disposed around said third-mentioned pipe section and in abutting relationship with the opposite end of said last-mentioned coupling member;
   e. a fourth plate member disposed around yet another pipe section and in abutting relationship with one end of another coupling member connecting said fourth-mentioned pipe section with an adjacent section located between said fourth-mentioned pipe section and said second-mentioned pipe section; and
   f. a second plurality of rod means for interlocking said third and fourth plates to one another for preventing those pipe sections positioned substantially entirely between said third and fourth plate members from otherwise axially moving relative to said first-mentioned pipe section in response to internal thrust forces caused by said pressured fluid.

2. An assembly according to claim 1 wherein each of said rod means includes a rod extending through cooperating openings in said plate members and means for preventing said rod from moving in an axial direction relative to said plate members.

3. An assembly according to claim 1 wherein said first-mentioned predetermined pipe section is a non-linear section adapted to change the direction of said pressurized fluid conveyed by said pipe arrangement.

4. A pipe assembly comprising:
   a. a plurality of spaced-apart and coaxial pipe sections;
   b. a plurality of coupling members, each of which is positioned around adjacent ends of said pipe sections sealingly connecting said pipe sections together;
   c. an additional pipe section, at least an end portion of which is spaced from and coaxial with one end of said connected pipe sections;
   d. an additional coupling member positioned around and sealingly connecting together said end portion and said one end;
   e. a first plate member connected with and around the end portion of said additional pipe section and restrained from axial movement relative to said additional pipe section in an axial direction towards said additional coupling member;
   f. a plurality of second plate members respectively disposed around selected ones of said plurality of pipe sections and in abutting relationship with selected ones of said plurality of coupling members; and g. a plurality of rods connected with said plate members for restraining those pipe sections positioned substantially entirely between said first plate member and the plate member position axially furthest from said first plate member from otherwise axially moving relative to said additional pipe section in response to internal thrust forces caused by said pressured fluid.

5. An assembly according to claim 4 wherein said plurality of pipe sections are constructed of a nonmetallic material.

6. A method of controlling thrust forces on a plurality of interconnected pipe sections provided for conveying fluids under pressure, said method comprising:
   a. positioning one of said pipe sections through an opening provided in a first plate member;
   b. securing said first plate member to said one pipe section;
   c. positioning another of said pipe sections through an opening provided in a second plate member;
   d. positioning said second plate member against one end of a coupling member connecting said second-mentioned pipe section with still another pipe section located between said first and second-mentioned pipe sections such that said plate members confront one another; and
   e. interlocking a plurality of rods with said first and second plate members for restraining those pipe sections positioned substantially entirely between said plate members from otherwise axially moving relative to said first-mentioned pipe section in response to internal thrust forces caused by said fluid under pressure.

7. A method according to claim 6 wherein said rods are interlocking with said plates by inserting said rods through cooperating holes in said plates and positioning nuts around threaded end portions of said rods and against the nonconfronting sides of said plates.

8. A method according to claim 6 including
   a. positioning said third-mentioned pipe section through an opening provided in a third plate member;
   b. positioning said third plate member against the other end of said coupling member such that said third plate member is in confronting relationship with and positioned between said first and second plate members;
   c. positioning yet another of said pipe sections through an opening provided in a fourth plate member;
   d. positioning said fourth plate member against one end of a second coupling member connecting said last-mentioned pipe section with an adjacent pipe section; and
   e. interlocking a second plurality of rods with said third and fourth plate members for restraining those pipe sections positioned substantially entirely between said third and fourth plate members from otherwise axially moving relative to said first-mentioned pipe section in response to internal axial thrust forces caused by said pressured fluid.

9. A method of controlling internal thrust forces in a pressurized fluid conveying pipe arrangement including a plurality of interconnected pipe sections and an interconnected fitting section provided for changing the direction of the pressurized fluid, said method comprising:
   a. positioning a main plate member around said fitting section;
   b. rigidly fixing said main plate with said fitting section;
   c. selecting specific pipe sections from said plurality of interconnected pipe sections;
   d. placing additional support plates around said selected pipe sections respectively, each of said additional plates being positioned in abutting relationship with one end of a coupling member connecting adjacent pipe sections with one another;
   e. dividing all of said plates into preselected groups; and
   f. interlocking the plates of each group by a plurality of rods for restraining said pipe sections from moving in response to internal thrust forces caused by said pressurized fluid.

* * * * *